(12) United States Patent
Katayama

(10) Patent No.: US 6,732,042 B2
(45) Date of Patent: May 4, 2004

(54) APPARATUS AND METHOD FOR DETECTING MISFIRE IN INTERNAL COMBUSTION ENGINE

(75) Inventor: Akihiro Katayama, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/445,886

(22) Filed: May 28, 2003

(65) Prior Publication Data

US 2003/0225504 A1 Dec. 4, 2003

(30) Foreign Application Priority Data

May 31, 2002 (JP) ........................................ 2002-159697

(51) Int. Cl.$^7$ .............................. G06F 19/00; F02P 5/00
(52) U.S. Cl. .................. 701/110; 123/406.13; 701/114; 701/102
(58) Field of Search ................................. 701/102, 110, 701/114, 111, 112; 123/406.13–406.17, 406.18, 419; 73/116, 117.3

(56) References Cited

U.S. PATENT DOCUMENTS

| 5,452,604 A | * | 9/1995 | Namiki et al. ................. 73/116 |
| 5,906,651 A | | 5/1999 | Amano ....................... 701/110 |
| 5,951,617 A | * | 9/1999 | Shinohara et al. .......... 701/110 |
| 5,954,784 A | * | 9/1999 | Inada et al. ................. 701/110 |
| 6,634,220 B1 | * | 10/2003 | Amano ....................... 73/117.3 |

FOREIGN PATENT DOCUMENTS

| DE | 195 35 094 A1 | 3/1997 |
| JP | A 9-126042 | 5/1997 |
| JP | A 10-318033 | 12/1998 |

* cited by examiner

Primary Examiner—Willis R. Wolfe
Assistant Examiner—Johnny H. Hoang
(74) Attorney, Agent, or Firm—Oliff & Berridge, PLC

(57) ABSTRACT

An ECU defines consecutively ignited three cylinders as first, second and third subject cylinders. The ECU first adds up the rotation fluctuation amount at the second subject cylinder and the rotation fluctuation amount at the third subject cylinder and sets the resultant as an added-up fluctuation amount. The ECU then determines whether the type of an occurring misfire is a single-cylinder misfire based on the added-up fluctuation amount. When the type of the occurring misfire is not a single-cylinder misfire, the ECU obtains the difference between the rotation fluctuation amount at the second subject cylinder and the rotation fluctuation amount at the third subject cylinder as a fluctuation amount deviation. Then, the ECU determines whether the type of the occurring misfire is a consecutive-two-cylinder misfire or an intermittent-two-cylinder misfire based on the fluctuation amount deviation. As a result, for any kind of a rotation fluctuation pattern caused by a misfire, the type of a misfire is accurately determined.

19 Claims, 10 Drawing Sheets

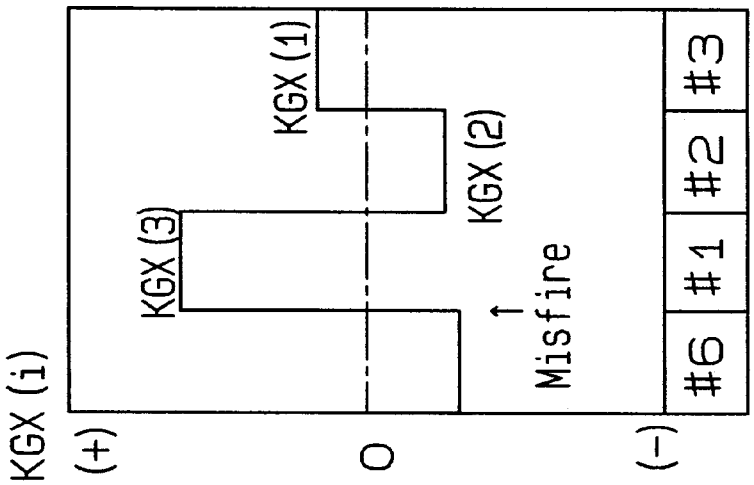
Fig.2(c) Varied Pattern 2
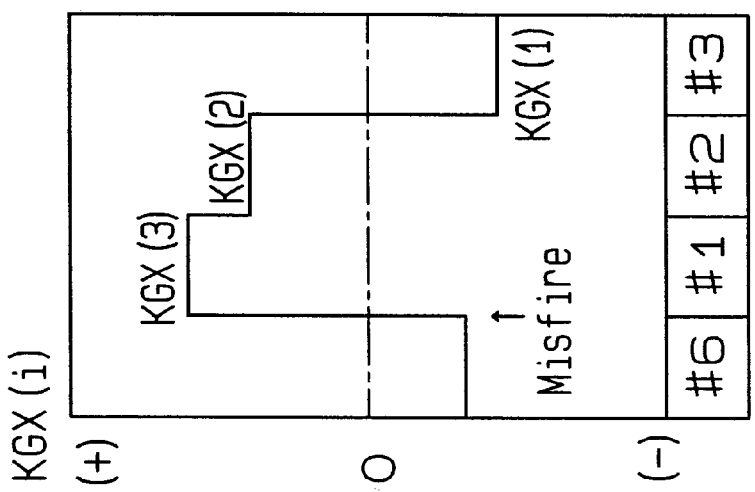
Fig.2(b) Varied Pattern 1
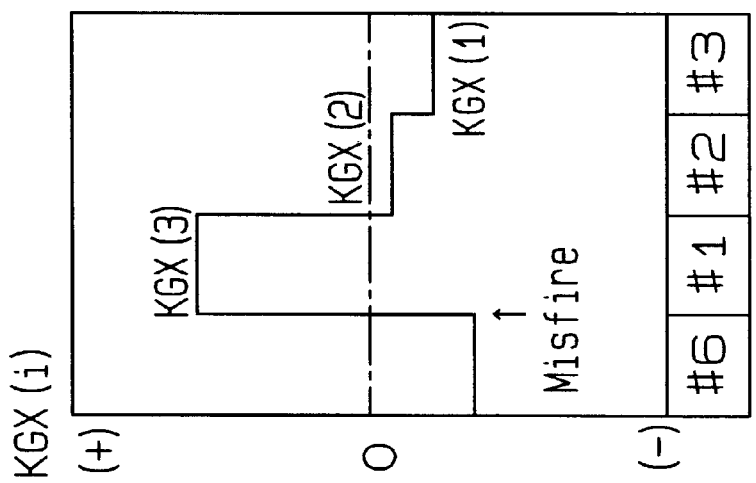
Fig.2(a) Basic Pattern 1

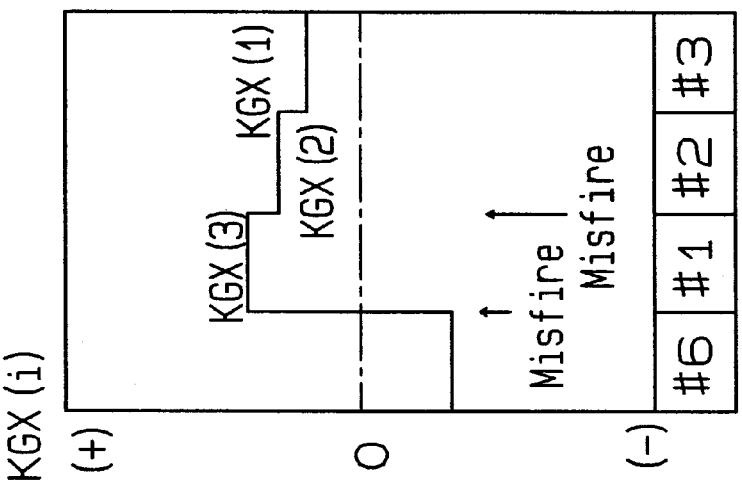
Fig.3(a) Basic Pattern 2
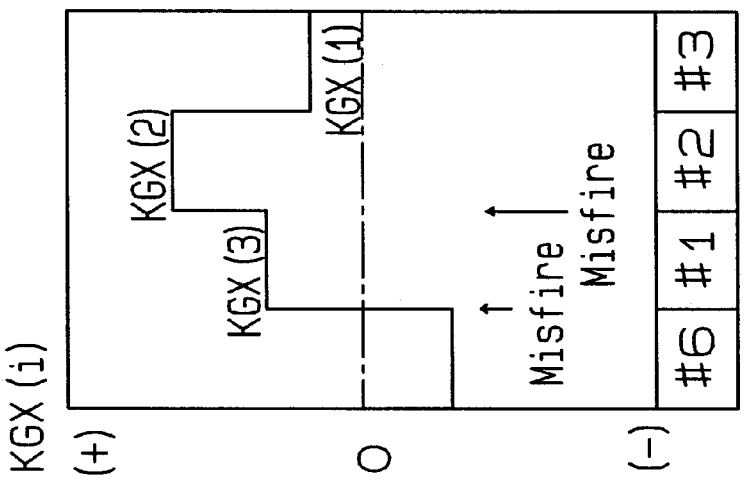
Fig.3(b) Varied Pattern 3
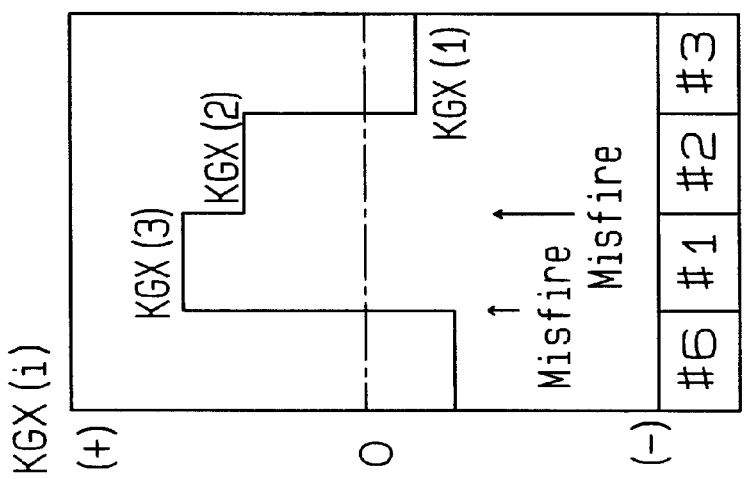
Fig.3(c) Varied Pattern 4

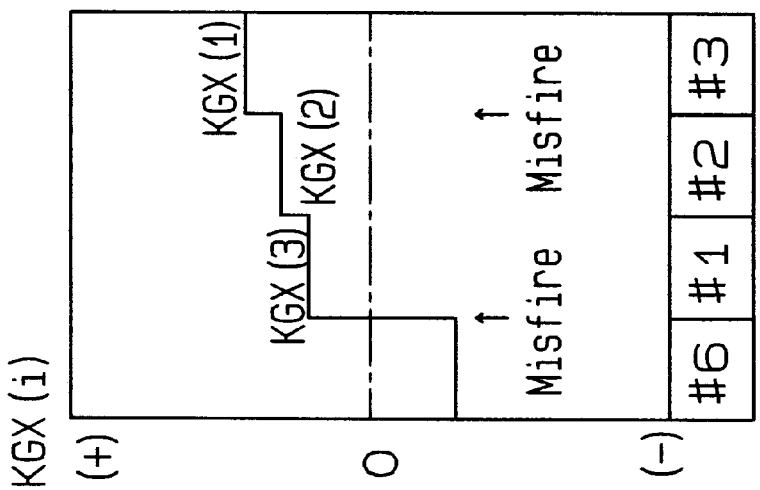
Fig.4(c) Varied Pattern 6
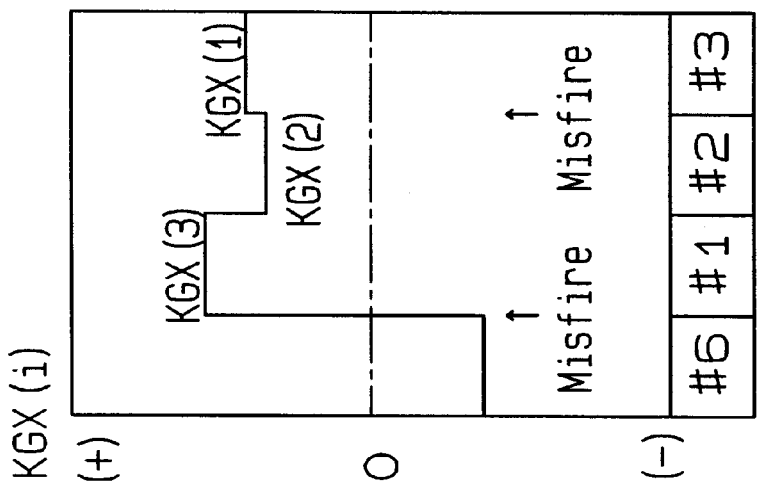
Fig.4(b) Varied Pattern 5
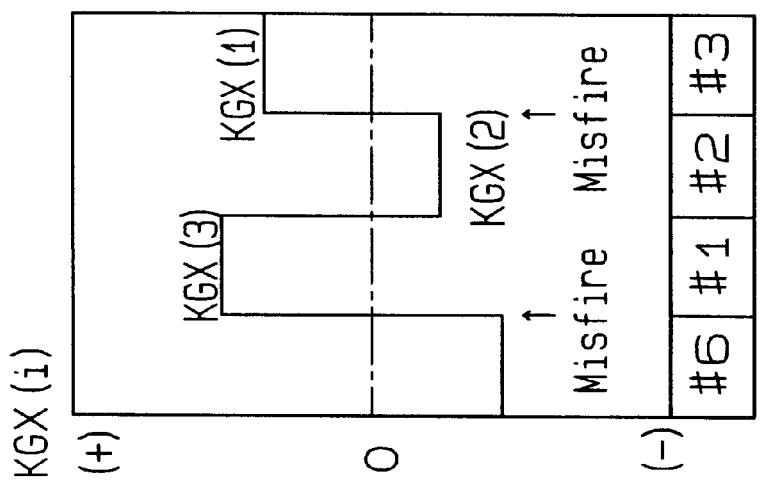
Fig.4(a) Basic Pattern 3

APPARATUS AND METHOD FOR DETECTING MISFIRE IN INTERNAL COMBUSTION ENGINE

BACKGROUND OF THE INVENTION

The present invention relates to an apparatus and a method for detecting misfires in an internal combustion engine, which apparatus and method detect misfires based on fluctuations in rotation of the engine. Particularly, the present invention relates to a technology for distinguishing which one of a single-cylinder misfire, a consecutive-cylinder misfire, and an intermittent-cylinder misfire is occurring in consecutively ignited three cylinders.

If ignition is missed, or if a misfire occurs, in a spark ignition type internal combustion engine, unburned fuel is discharged to an exhaust passage. This degrades emission and lowers the engine performance. Thus, a number of measures have been taken for preventing misfires. However, a misfire can occur despite the taken measures. It is therefore desired that a misfire be quickly and accurately detected.

Accordingly, various devices for detecting a misfire have been proposed. For example, Japanese Laid-Open Patent Publication No. 10-318033 disclosed a misfire detecting apparatus for a multi-cylinder internal combustion engine. The misfire detecting apparatus detects three types of misfire in three cylinders that are consecutively ignited. That is, the apparatus detects a case where a misfire occurs in only one of three consecutive cylinders (single-cylinder misfire), a case where a misfire occurs in two consecutive cylinders (consecutive-two-cylinder misfire), and a case where a misfire occurs in nonconsecutive two cylinders with a normal combustion in the cylinder in between (intermittent-two-cylinder misfire).

In the above publication, it is assumed that a misfire occurs in the leading one of three cylinders to be ignited consecutively, a rotation fluctuation $\Delta TN$ of the engine (crankshaft) has different patterns in the single-cylinder misfire, the consecutive-two-cylinder misfire, and the intermittent-two-cylinder misfire. FIGS. 14(a) to 14(c) show cases where ignition is executed in a first cylinder #1, a second cylinder #2, and a third cylinder #3 in this order after a normal combustion in a sixth cylinder #6, and a misfire occurs in the first cylinder #1. In FIGS. 14(a) to 14(c), $\Delta T3$ denotes a rotation fluctuation amount at the first cylinder #1, $\Delta T2$ denotes a rotation fluctuation amount at the second cylinder #2, and $\Delta T1$ denotes a rotation fluctuation amount at the third cylinder #3.

As shown in FIG. 14(a), in the single-cylinder misfire, where a misfire occurs only in the first cylinder #1, $\Delta T3$ is relatively great, and $\Delta T2$ and $\Delta T1$ are relatively small. As shown in FIG. 14(b), in the consecutive-two-cylinder misfire, where a misfire occurs in the first cylinder #1 and the second cylinder #2, $\Delta T3$ and $\Delta T2$ are relatively great, and $\Delta T1$ is relatively small. As shown in FIG. 14(c), in the intermittent-two-cylinder misfire, where a misfire occurs in the first cylinder #1 and the third cylinder #3, $\Delta T3$ is relatively great, $\Delta T2$ is relatively small, and $\Delta T1$ is relatively great.

The apparatus of the publication determines the type of the occurring misfire based on the above described patterns of rotation fluctuations. That is, the apparatus compares the rotation fluctuation amounts $\Delta T1$, $\Delta T2$, $\Delta T3$ with one another using predetermined constants k1, k2. When an inequality $\Delta T3 \cdot k1 < \Delta T1$ is satisfied, the apparatus determines that the intermittent-two-cylinder misfire is occurring. When the inequality $\Delta T3 \cdot k1 < \Delta T1$ is not satisfied, and an inequality $\Delta T3 \cdot k2 < \Delta T2$ is satisfied, the apparatus determines that the consecutive-two-cylinder misfire is occurring. When the inequality $\Delta T3 \cdot k1 < \Delta T1$ and the inequality $\Delta T3 \cdot k2 < \Delta T2$ are both satisfied, the apparatus determines that the single-cylinder misfire is occurring.

However, tests carried out by varying conditions such as the type of the engine and the running states of the engine, such as the engine rotation speed and the engine load, revealed that the above listed rotation fluctuation patterns are mere typical ones and that there are other various rotation fluctuation patterns.

For example, in the single-cylinder misfire shown in FIG. 14(a), the rotation fluctuation amount $\Delta T2$ at the second cylinder #2 can have a minus value, and the rotation fluctuation amount $\Delta T1$ at the third cylinder #3 can have a plus value. As for the consecutive-two-cylinder misfire shown in FIG. 14(b) and the intermittent-two-cylinder misfire shown in FIG. 14(c), various patterns other than the above listed ones can appear. These phenomena occur in, for example, in-line six cylinder engines, and particularly in an engine that has a sensor for detecting the engine rotation speed at one end of the row of the cylinders. One reason for this is that a rotation fluctuation caused by a misfire is affected and changed by a torsional resonance of the crankshaft before reaching the sensor, and it is therefore difficult to accurately detect the rotation fluctuation.

The misfire detection apparatus of the above publication determines the type of a misfire on the assumption that a rotation fluctuation pattern obtained based on detection values of the sensor matches with one of the typical rotation fluctuation patterns shown in FIGS. 14(a) to 14(c). Therefore, when a rotation fluctuation pattern during a misfire is different from the typical patterns, the type of the occurring misfire can be erroneously determined. To avoid erroneous determinations, the apparatus must be applied only to a limited types of engines. Also, the apparatus is only capable of detecting a misfire in a limited number of engine running states.

SUMMARY OF THE INVENTION

Accordingly, it is an objective of the present invention to provide an apparatus and a method for detecting a misfire in an internal combustion engine, which apparatus and method are capable of functioning in various rotation fluctuation patterns that appear due to a misfire.

To achieve the foregoing and other objectives and in accordance with the purpose of the present invention, a misfire detection apparatus for an internal combustion engine having a plurality of cylinders is provided. The apparatus selects three of the cylinders that are consecutively ignited as subjects of misfire detection, and defines the selected cylinders as a first subject cylinder, a second subject cylinder, and a third subject cylinder in an order of ignition. The apparatus is capable of detecting three types of misfire including a single-cylinder misfire, in which a misfire occurs only in the first subject cylinder, a consecutive-two-cylinder misfire, in which a misfire occurs in the first and second subject cylinders, and an intermittent-two-cylinder misfire, in which a misfire occurs in the first and third subject cylinders. The apparatus includes computation menas, first determination means, second determination means, and third determination means. The computation means obtains a rotation fluctuation amount of the engine at each of the first to third subject cylinders. The first determination means determines whether a misfire is occurring in the first subject cylinder based on the rotation fluctuation amount at the first subject cylinder. When it is determined that a misfire is occurring in the first subject cylinder, the second determination means determines whether the type of the occurring misfire is a single-cylinder misfire based on the rotation fluctuation amount at the second subject cylinder and the rotation fluctuation amount at the third subject cylinder. When it is determined that the type of the occurring misfire is not a single-cylinder misfire, the third determination means determines whether the type of the occurring misfire is a consecutive-two-cylinder misfire or an intermittent-two-cylinder misfire based on the rotation fluctuation amount at the second subject cylinder and the rotation fluctuation amount at the third subject cylinder.

In another aspect of the present invention, a misfire detection method for an internal combustion engine having a plurality of cylinders is provided. The method includes: selecting three of the cylinders that are consecutively ignited as subjects of misfire detection, and defining the selected cylinders as a first subject cylinder, a second subject cylinder, and a third subject cylinder in an order of ignition; and determining a occurring misfire to be one of three types of misfire including a single-cylinder misfire, in which a misfire occurs only in the first subject cylinder, a consecutive-two-cylinder misfire, in which a misfire occurs in the first and second subject cylinders, and an intermittent-two-cylinder misfire, in which a misfire occurs in the first and third subject cylinders. The determining of the misfire type includes: obtaining a rotation fluctuation amount of the engine at each of the first to third subject cylinders; determining whether a misfire is occurring in the first subject cylinder based on the rotation fluctuation amount at the first subject cylinder; determining whether the type of the occurring misfire is a single-cylinder misfire based on the rotation fluctuation amount at the second subject cylinder and the rotation fluctuation amount at the third subject cylinder when it is determined that the misfire is occurring in the first subject cylinder; and determining whether the type of the occurring misfire is a consecutive-two-cylinder misfire or an intermittent-two-cylinder misfire based on the rotation fluctuation amount at the second subject cylinder and the rotation fluctuation amount at the third subject cylinder when it is determined that the type of the occurring misfire is not a single-cylinder misfire.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 2(a) to 2(c) are graphs each showing a rotation fluctuation pattern in a single-cylinder misfire;

FIGS. 3(a) to 3(c) are graphs each showing a rotation fluctuation pattern in a consecutive-two-cylinder misfire;

FIGS. 4(a) to 4(c) are graphs each showing a rotation fluctuation pattern in an intermittent-two-cylinder misfire;

DETAILED DESCRIPTION OF THE PREFERRED EMBODIMENTS

An in-line six cylinder engine according to a first embodiment of the present invention will now be described with reference to FIGS. 1 to 8.

Figure 1:
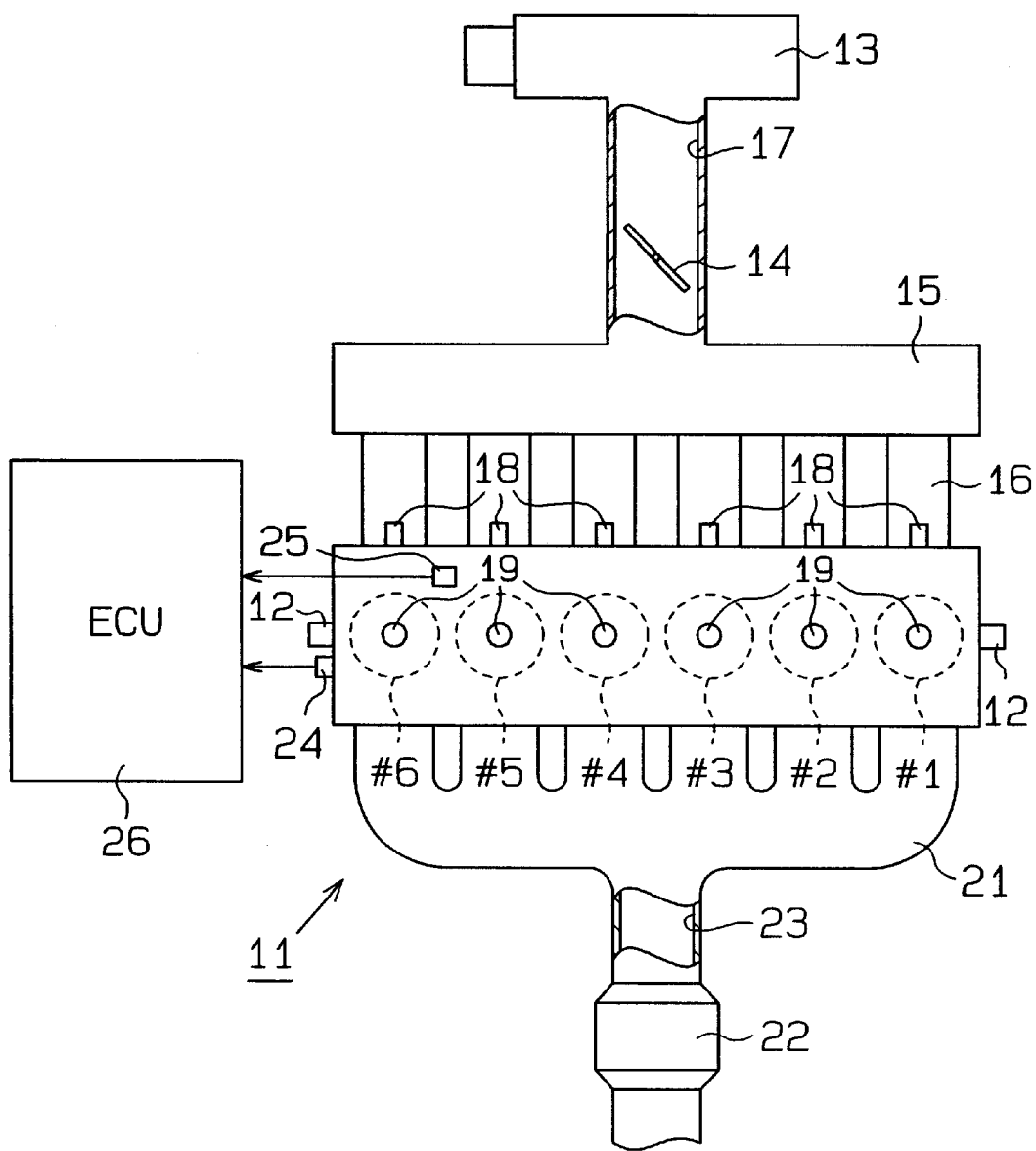
FIG. 1 is a diagrammatic view illustrating an engine system according to a first embodiment of the present invention.

As shown in FIG. 1, the engine 11 has in-line six cylinders, or a first cylinder #1, a second cylinder #2, a third cylinder #3, a fourth cylinder #4, a fifth cylinder #5, and a sixth cylinder #6. A piston is accommodated in each of the cylinders #1 to #6. Each piston reciprocates in the associated cylinder. A crankshaft 12, which is an output shaft of the engine 11, extends in a direction along which the cylinders are arranged (lateral direction as viewed in FIG. 1). The crankshaft 12 rotates as the pistons reciprocate.

The engine 11 has combustion chambers, each of which correspond to one of the first to sixth cylinders #1 to #6. The combustion chambers are connected to an intake passage 17. The intake passage 17 includes an air cleaner 13, a throttle valve 14, a surge tank 15, and an intake manifold 16. Air outside of the engine 11 is conducted to each combustion chamber through the intake passage 17. A throttle valve 14 is rotatably supported in the intake passage 17 to regulate the flow rate of air flowing through the intake passage 17.

The engine 11 has electromagnetic fuel injectors 18 each corresponding to one of the first to sixth cylinders #1 to #6. Each fuel injector 18 injects pressurized fuel into the corresponding combustion chamber. Injected fuel is mixed with intake air that is conducted into the combustion chamber through the intake passage 17. This forms air-fuel mixture in the combustion chamber.

The engine 11 has spark plugs 19 each corresponding to one of the first to sixth cylinders #1 to #6. The mixture in each of the first to sixth cylinders #1 to #6 is ignited by electrical sparks of the spark plugs 19 sequentially (for example, in an order of #1, #2, #3, #4, #5, and #6). This explodes and burns the mixture. High temperature and high pressure combustion gas is generated and reciprocates the piston. Accordingly, the crankshaft 12 is rotated, and driving force (output torque) of the engine 11 is generated.

An exhaust passage 23 is connected to the combustion chambers. The exhaust passage 23 has an exhaust manifold 21 and a catalytic converter 22. Combustion gas generated in each combustion chamber is discharged to the outside of the engine 11 through the exhaust passage 23.

The engine 11 is equipped with various sensors for detecting the running state of the engine 11. For example, a crank angle sensor 24 is provided at one end of the row of the cylinders of the engine 11 (the end at the sixth cylinder #6 in FIG. 1). The crank angle sensor 24 outputs a pulse signal every time the crankshaft 12 rotates by a predetermined angle The crank angle sensor 24 includes a rotor attached to the crankshaft 12. The rotor has projections at every 30° CA (CA represents a crank angle, which is the rotational angle of the crankshaft 12). Thus, the crank angle sensor 24 generates twenty-four pulse signals while the crankshaft 12 rotates two turns, that is, during one cycle of each cylinder, which includes an intake stroke, a compression stroke, a combustion stroke, and an exhaust stroke. The crankshaft 12 rotates by 180° CA during the four strokes in each cylinder.

A cylinder distinguishing sensor 25 is provided in the vicinity of a camshaft (not shown), which is coupled to the crankshaft 12. Every time the camshaft rotates one turn, that is, every time the crankshaft 12 rotates two turns (720° CA), the cylinder distinguishing sensor 25 generates a pulse signal that serves as a reference position signal. Specifically, the cylinder distinguishing sensor 25 generates a pulse signal every time the piston in a predetermined reference cylinder (for example, the first cylinder #1) reaches the top dead center of a compression stroke. Signals from the crank angle sensor 24 and signals from the cylinder distinguishing sensor 25 are used for computing the crank angle and the engine rotation speed NE (the speed of the crankshaft 12), and for distinguishing the cylinders #1 to #6. Other than the sensors 24, 25, the engine 11 is equipped with a number of sensors. These sensors, however, are not illustrated or described.

An electronic control unit (ECU) 26 is provided for controlling various parts of the engine 11 based on detection values of sensors including the crank angle sensor 24 and the cylinder distinguishing sensor 25. The ECU 26 is constructed with a microcomputer as the dominant constituent, and includes a central processing unit (CPU), a read only memory (ROM), and a random access memory (RAM). The CPU performs computation according to control programs and initial data stored in the ROM, and executes various controls based on the computation results. The computation results of the CPU are temporarily stored in the RAM.

The controls executed by the ECU 26 include a misfire detection procedure. Types of misfires that are detected in the procedure are divided into three categories depending on how a misfire occurs in three cylinders that are consecutively ignited. The first type is a case where a misfire occurs in only one of three consecutive cylinders (single-cylinder misfire). The second type is a case where a misfire occurs in two consecutive cylinders (consecutive-two-cylinder misfire). The third type is a case where two misfires occur with one normal combustion in between (intermittent-two-cylinder misfire).

The ECU 26 detects a misfire based on a rotation fluctuation amount $KGX(i)$ of the crankshaft 12 at each of the cylinders #1 to #6. The rotation fluctuation $KGX(i)$ in each cylinder is represented by the following equation.

$$KGX(i)=T120(i)-T120(i-1)$$

$T120(i)$ denotes a period elapsed in a predetermine interval of 120° CA in a combustion stroke of each cylinder. That is, in each cylinder, the crankshaft 12 rotates by 180° CA in a combustion stroke. $T120(i)$ represents a period required for the crankshaft 12 to rotate the predetermined interval of 120° CA within the range of 180° CA. Hereinafter, $T120(i)$ will be referred to as elapsed time in a combustion stroke of a cylinder. $T120(i-1)$ denotes the elapsed time in a combustion stroke of a cylinder that is ignited immediately before the ignition of the cylinder of $T120(i)$.

Therefore, the rotation fluctuation amount $KGX(i)$ represents the difference between the elapsed time of a combustion stroke in two cylinders of consecutive ignitions. In other words, the rotation fluctuation amount $KGX(i)$ represents the rotation fluctuation amount in the crankshaft 12 during consecutive ignitions in two cylinders.

In the following description, a misfire in the first to third cylinders #1 to #3, which are consecutively ignited, are subjected to the misfire detection, and the first cylinder #1, which is ignited first, is set as a first subject cylinder. The description will be given on cases where a misfire occurs in the first subject cylinder in the three types of misfires. A cylinder that is ignited subsequent to the first subject cylinder will be referred to as a second subject cylinder. A cylinder that is ignited subsequent to the second subject cylinder will be referred to as a third subject cylinder.

The rotation fluctuation amount at the first cylinder #1 is denoted as $KGX(3)$, the rotation fluctuation amount at the second cylinder #2 is denoted as $KGX(2)$, and the rotation fluctuation amount at the third cylinder #3 is denoted as $KGX(1)$. The rotation fluctuation amounts $KGX(3)$, $KGX(2)$, and $KGX(1)$ satisfy the following equations.

$$KGX(3)=T120(3)-T120(4)$$
$$KGX(2)=T120(2)-T120(3)$$
$$KGX(1)=T120(1)-T120(2)$$

$T120(4)$ denotes the elapsed time in a combustion stroke of the sixth cylinder #6, which is ignited immediately before the ignition of the first cylinder #1. $T120(3)$ denotes the elapsed time in a combustion stroke of the first cylinder #1, $T120(2)$ denotes the elapsed time in a combustion stroke of the second cylinder #2, and $T120(1)$ denotes the elapsed time in a combustion stroke of the third cylinder #3.

FIGS. 2(a) to 2(c) show patterns of the rotation fluctuation amounts $KGX(i)$ at the first to third cylinders #1 to #3. These patterns appear when a single-cylinder misfire occurs periodically. In this case, a misfire occurs only in the first cylinder #1, which is the first one of the consecutively ignited cylinders #1 to #3.

FIG. 2(a) shows a typical rotation fluctuation pattern that is observed in a single-cylinder misfire. The pattern of FIG. 2(a) will hereinafter be referred to as a basic pattern 1. In FIG. 2(a), the rotation fluctuation amount $KGX(3)$ at the first cylinder #1 sways to the plus region. This is because the misfire in the first cylinder #1 extends the elapsed time $T120(3)$ of a combustion stroke of the first cylinder #1 compared to the elapsed time $T120(4)$ of a combustion stroke of the sixth cylinder #6. The rotation fluctuation amount $KGX(2)$ at the second cylinder #2 is in the minus region by a small degree. This is because the normal combustion in the second cylinder #2 accelerates rotation of the crankshaft 12, and the elapsed time $T120(2)$ of a combustion stroke of the second cylinder #2 is shortened accordingly relative to the elapsed time $T120(3)$ of a combustion stroke of the first cylinder #1. The rotation fluctuation amount $KGX(1)$ at the third cylinder #3 is in the minus region by a degree greater than that of the rotation fluctuation amount $KGX(2)$ at the second cylinder #2. This is because the normal combustion in the third cylinder #3 further accelerates rotation of the crankshaft 12, and the elapsed time $T120(1)$ of a combustion stroke of the third cylinder #3 is further shortened accordingly relative to the elapsed time $T120(2)$ of the combustion stroke at the second cylinder #2.

FIGS. 2(b) and 2(c) show rotation fluctuation patterns in a single-cylinder misfire other than the basic pattern 1. The patterns of FIGS. 2(b) and 2(c) appear depending on the type of the engine 11 and the running state (for example, the engine rotation speed NE and the engine load) of the engine 11. To distinguish the patterns of FIGS. 2(b) and 2(c) from the basic pattern 1, the patterns of FIGS. 2(b) and 2(c) will hereinafter be referred to as a varied pattern 1 and a varied pattern 2. A significant difference of the varied pattern 1 from the basic pattern 1 is that the rotation fluctuation amount KGX(2) at the second cylinder #2 is in the plus region. A significant difference of the varied pattern 2 from the basic pattern 1 is that the rotation fluctuation at the third cylinder #3 is in the plus region.

FIGS. 3(a) to 3(c) show patterns of the rotation fluctuation amounts KGX(i) at the first to third cylinders #1 to #3. These patterns appear when a consecutive-two-cylinder misfire occurs periodically. In this case, a misfire occurs in the first cylinder #1 and the second cylinder #2, which is ignited immediately after the first cylinder #1 is ignited.

FIG. 3(a) shows a typical rotation fluctuation pattern that is observed in a consecutive-two-cylinder misfire. The pattern of FIG. 3(a) will hereinafter be referred to as a basic pattern 2. In FIG. 3(a), the rotation fluctuation amount KGX(3) at the first cylinder #1 sways to the plus region for the same reason as the case of the single-cylinder misfire. The rotation fluctuation amount KGX(2) at the second cylinder #2 is in the minus region as in the case of the first cylinder #1. This is because a misfire in the second cylinder #2 further decelerates rotation of the crankshaft 12, and the elapsed time T120(2) of a combustion stroke of the second cylinder #2 is extended accordingly relative to the elapsed time T120(3) of a combustion stroke of the first cylinder #1. The rotation fluctuation amount KGX(3) at the third cylinder #3 is in the minus region. This is because the normal combustion in the third cylinder #3 accelerates rotation of the crankshaft 12, and the elapsed time T120(1) of a combustion stroke of the third cylinder #3 is shortened accordingly relative to the elapsed time T120(2) of a combustion stroke of the second cylinder #2.

FIGS. 3(b) and 3(c) show rotation fluctuation patterns in a consecutive-two-cylinder misfire other than the basic pattern 2. The patterns of FIGS. 3(b) and 3(c) appear depending on the type of the engine 11 and the running state (for example, the engine rotation speed NE and the engine load) of the engine 11. To distinguish the patterns of FIGS. 3(b) and 3(c) from the basic pattern 2, the patterns of FIGS. 3(b) and 3(c) will hereinafter be referred to as a varied pattern 3 and a varied pattern 4. A significant difference of the varied pattern 3 from the basic pattern 2 is that the rotation fluctuation amount KGX(2) at the second cylinder #2 is greater than the rotation fluctuation amount KGX(3) at the first cylinder #1, and that the rotation fluctuation amount KGX(1) at the third cylinder #3 is in the plus region. A significant difference of the varied pattern 4 from the basic pattern 2 is that the rotation fluctuation amount KGX(1) at the third cylinder #3 is in the plus region.

FIGS. 4(a) to 4(c) show patterns of the rotation fluctuation amounts KGX(i) at the first to third cylinders #1 to #3. These patterns appear when an intermittent-two-cylinder misfire occurs periodically. In this case, a misfire occurs in the first cylinder #1 and the third cylinder #3, which is a second cylinder that is ignited after the first cylinder #1 is ignited.

FIG. 4(a) shows a typical rotation fluctuation pattern that is observed in an intermittent-two-cylinder misfire. The pattern of FIG. 4(a) will hereinafter be referred to as a basic pattern 3. In FIG. 4(a), the rotation fluctuation amount KGX(3) at the first cylinder #1 sways to the plus region for the same reason as the case of the single-cylinder misfire. The rotation fluctuation amount KGX(2) at the second cylinder #2 is in the minus region. This is also for the same reason as the case of the single-cylinder misfire. The rotation fluctuation amount KGX(1) at the third cylinder #3 is in the plus region. This is because a misfire in the third cylinder #3 decelerates rotation of the crankshaft 12, and the elapsed time T120(3) of a combustion stroke of the third cylinder #3 is extended accordingly relative to the elapsed time T120(2) of a combustion stroke of the second cylinder #2.

FIGS. 4(b) and 4(c) show rotation fluctuation patterns in an intermittent-two-cylinder misfire other than the basic pattern 3. The patterns of FIGS. 4(b) and 4(c) appear depending on the type of the engine 11 and the running state (for example, the engine rotation speed NE and the engine load) of the engine 11. To distinguish the patterns of FIGS. 4(b) and 4(c) from the basic pattern 3, the patterns of FIGS. 4(b) and 4(c) will hereinafter be referred to as a varied pattern 5 and a varied pattern 6. A significant difference of the varied pattern 5 from the basic pattern 3 is that the rotation fluctuation amount KGX(2) at the second cylinder #2 is in the plus region. A significant difference of the varied pattern 6 from the basic pattern 3 is that the rotation fluctuation amount KGX(2) at the second cylinder #2 is greater than the rotation fluctuation amount KGX(3) at the first cylinder #1, and that the rotation fluctuation amount KGX(1) at the third cylinder #3 is greater than the rotation fluctuation amount KGX(3) at the first cylinder #1.

The basic patterns 1 to 3 and the varied patterns 1 to 6 will now be considered. In the following discussion, descriptions that a rotation fluctuation amount is great or small does not refers to the absolute values of the amounts being great or small unless otherwise indicated. A description that the rotation fluctuation amount is greater than another value refers to a case where the rotation fluctuation amount is more than the value, and description that a rotation fluctuation amount is smaller than another value refers to a case where the rotation fluctuation is less than the value. A single-cylinder misfire is different from a two-cylinder misfire (including the consecutive-two-cylinder misfire and the intermittent-two-cylinder misfire) in the following points. That is, in any of the rotation fluctuation patterns of FIGS. 2(a) to 2(c) of a single-cylinder misfire, the sum of the rotation fluctuation amount KGX(2) at the second cylinder #2, in which a normal combustion is performed, and the rotation fluctuation amount KGX(1) at the third cylinder #3, in which a normal combustion is performed, is less than zero. For example, in the varied pattern 1 of FIG. 2(b), the absolute values of the rotation fluctuation amounts KGX(2) and KGX(1) are both relatively great. However, the rotation fluctuation amount KGX(2) is in the plus region, and the rotation fluctuation amount KGX(1) is in the minus region. The sum of the rotation fluctuation amounts KGX(2), KGX(1) is a minus value that is slightly less than zero. Conversely, in each two-cylinder misfire, the rotation fluctuation amount in one of the second and third cylinders #2 and #3 in which combustion is performed normally is less than the other one of the cylinders #2 and #3, in which a misfire occurs (see FIGS. 3(a) to 3(c) and FIGS. 4(a) to 4(c)). In any of the rotation fluctuation patterns of FIGS. 3(a) to 4(c), the sum of the rotation fluctuation amount in one of the second and third cylinders #2 and #3 in which a normal combustion is performed and the rotation fluctuation amount in the other one of the second and third cylinders #2 and #3, in which a misfire occurs, is more than zero. Therefore, the sum of the rotation fluctuation amount KGX(2) at the second cylinder #2 and the rotation fluctuation amount KGX(1) at the third cylinder #3 (hereinafter referred to as an added-up fluctuation amount KGX(+)) is less in a single-cylinder misfire than in a two-cylinder misfires.

Therefore, when the added-up fluctuation amount KGX (+) is compared with a first determination value α, the added-up fluctuation amount KGX(+) is less than the first determination value α in the single-cylinder misfire. The added-up fluctuation amount KGX(×) is equal to or more than the first determination value α in the consecutive-two-cylinder misfire and in the intermittent-two-cylinder misfire. The first determination value α is obtained in a manner discussed below. The first determination value α is an intermediate value of the added-up fluctuation amount KGX (+) in the single-cylinder misfire and the added-up fluctuation amount KGX(+) in the two-cylinder misfire. In this embodiment, the first determination value α is set to zero.

The consecutive-two-cylinder misfire is different from the intermittent-two-cylinder misfire in the following points. That is, in a consecutive-two-cylinder misfire, the rotation fluctuation KGX(2) at the second cylinder #2, in which a misfire occurs, is more than the rotation fluctuation KGX(1) at the third cylinder #3, in which a normal combustion is performed (see FIGS. 3(a) to 3(c)). In any of the rotation fluctuation patterns of FIGS. 3(a) to 3(c), the value obtained by subtracting the rotation fluctuation amount KGX(1) from the rotation fluctuation amount KGX(2) is more than zero. For example, in the basic pattern 2 shown in FIG. 3(a), a plus value is obtained by subtracting the rotation fluctuation amount KGX(1), which is a minus value, from the rotation fluctuation amount KGX(2), which is a plus value. On the other hand, unlike the consecutive-two-cylinder misfire, in the intermittent-two-cylinder misfire, the rotation fluctuation KGX(2) at the second cylinder #2, in which a normal combustion is performed, is less than the rotation fluctuation KGX(1) at the third cylinder #3, in which a misfire occurs (see FIGS. 4(a) to 4(c)). In any of the rotation fluctuation patterns of FIGS. 4(a) to 4(c), the value obtained by subtracting the rotation fluctuation amount KGX(1) from the rotation fluctuation amount KGX(2) is equal to or less than zero. For example, in the basic pattern 3 shown in FIG. 4(a), a minus value is obtained by subtracting the rotation fluctuation amount KGX(1), which is a plus value, from the rotation fluctuation amount KGX(2), which is a minus value. The relationship between the rotation fluctuation amounts KGX(2) and KGX(1) in a consecutive-two-cylinder misfire is opposite from that in an intermittent-two-cylinder misfire. Therefore, the value computed by subtracting the rotation fluctuation amount KGX(1) at the third cylinder #3 from the rotation fluctuation amount KGX(2) at the second cylinder #2 (hereinafter referred to as fluctuation amount deviation KGX(−)) is more in the consecutive-two-cylinder misfire than in the intermittent-two-cylinder misfire.

Therefore, when the fluctuation amount deviation KGX (−) is compared with a second determination value β, the fluctuation amount deviation KGX(−) is more than the second determination value β in a consecutive-two-cylinder misfire. The fluctuation amount deviation KGX(−) is equal to or less than the second determination value β in an intermittent-two-cylinder misfire. The second determination value β is an intermediate value of the fluctuation amount deviation KGX(−) in a consecutive-two-cylinder misfire and the fluctuation amount deviation KGX(−) in an intermittent-two-cylinder misfire. The second determination value β is set to zero in this embodiment.

A misfire detection routine executed by the ECU 26 will now be described with reference to flowcharts of FIGS. 5 and 6. The misfire detection routine is executed in an interrupting manner every predetermined crank angle (for-example, every thirty degrees).

Figure 5:
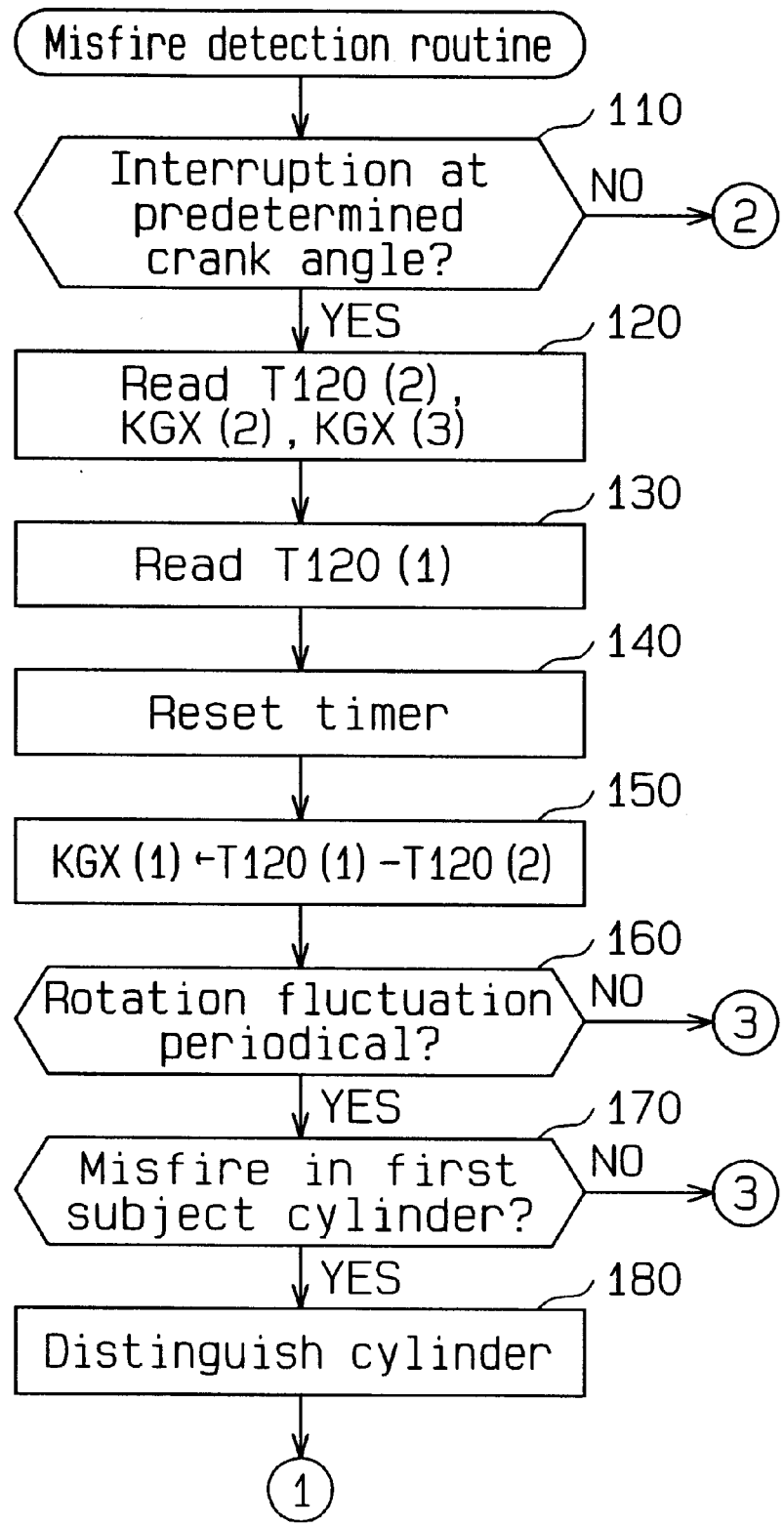
FIG. 5 is a flowchart showing the first half of a misfire detection routine.

When the misfire detection routine is started, the ECU 26 determines whether the current routine has started at the predetermined crank angle in step 110 of FIG. 5. That is, the ECU 26 determines whether the interruption timing of the current routine corresponds to a time at which the crankshaft 12 has rotated by an angle of 30° CA, 150° CA, 270° CA, 390° CA, 510° CA, or 630° CA from the time at which the first cylinder #1, which is a reference cylinder, reaches a top dead center of a compression stroke. Based on pulse signals generated by the cylinder distinguishing sensor 25 every 720° CA, the ECU 26 acknowledges that the piston in the first cylinder #1 has reached the top dead center of a compression stroke. Step 110 is executed for obtaining a starting point that is used for measuring the time elapsed in a combustion stroke of the cylinder. The obtained starting point is necessary for computing the rotation fluctuation amount KGX(i). If the outcome of step 110 is negative, the ECU 26 temporarily suspends the current routine. If the outcome of step 110 is positive, the ECU 26 proceeds to step 120. Therefore, step 120 is executed at every 120° CA.

In step 120, the ECU 26 reads from the RAM the elapsed time T120(2), the rotation fluctuation amounts KGX(2), KGX(3), which have been set and stored in the previous misfire detection routine. As described above, in this embodiment, three cylinders that are consecutively ignited are subjected to the misfire detection. One of the three cylinders that is ignited first is referred to as a first subject cylinder. The cylinder that is ignited subsequent to the first subject cylinder is referred to as a second subject cylinder. The cylinder that is ignited subsequent to the second subject cylinder is referred to as a third subject cylinder. KGX(3) is set as a rotation fluctuation amount at the first subject cylinder. KGX(2) is set as a rotation fluctuation amount at the second subject cylinder. T120(2) is set as an elapsed time in a combustion stroke of the second subject cylinder and is used in later steps for obtaining the rotation fluctuation amount KGX(1) in the third subject cylinder.

Next, the ECU 26 reads a measured value of its own timer as an elapsed time T120(1) in a combustion stroke of the third subject cylinder. In step 140, the ECU 26 resets the timer. Therefore, the timer sets the elapsed time from when the timer was reset in step 140 of the previous routine to when the timer is reset in step 140 in the current routine as T120(1). In other words, the timer sets the period in which the crankshaft 12 rotates by 120° CA as T120(1). In step 130, the ECU 26 also reads various parameters necessary for computation of the misfire detection routine, such as a counter value CFN, and the engine rotation speed NE. The counter value CFN will be discussed below.

In step 150, the ECU 26 subtracts the elapsed time T120 read in step 120 from the elapsed time T120(1) read in step 130, thereby obtaining the rotation fluctuation amount KGX (1) at the third subject cylinder. The rotation fluctuation amount KGX(1) is the difference between the elapsed time T120(1) of the current combustion stroke and the elapsed time T120(2) of the previous combustion stroke.

In step 160, the ECU 26 determines whether rotation fluctuations of the crankshaft 12 caused by misfires occur periodically. To determine whether rotation fluctuation occurs periodically, the ECU 26 determines whether an increase of a rotation fluctuation amount due to a misfire into the plus region occurs every sixth cylinder, or every 720° CA. For example, if a crank angle is counted from the rise of a rotation fluctuation of the first subject cylinder to the rise of the next rotation fluctuation of the first subject cylinder, and the counted crank angle is 720° CA, the ECU 26 determines that a periodic rotation fluctuation due to the misfire in the first subject cylinder is occurring. Specifically, a third determination value γ is used for detecting a rise of a rotation fluctuation. After the rotation fluctuation amount exceeds the third determination value γ, the counter value CFN of a counter (not shown) in the ECU 26 is increased to 120° CA. If the rotation fluctuation amount exceeds the third determination value γ when the counter value CFN reaches a predetermined value (in this embodiment, five), that is, when the crankshaft 12 has rotated by 720° CA since the rotation fluctuation amount exceeds the third determination value γ, the ECU 26 determines that rotation fluctuation is occurring periodically.

The third determination value γ may be a relatively small value. This is because a cylinder that is ignited after a cylinder in which a normal combustion is performed is denoted as the first subject cylinder in any of a single-cylinder misfire, a consecutive-two-cylinder misfire, and an intermittent-two-cylinder misfire. In a cylinder that is ignited immediately before the first subject cylinder, a normal combustion is performed. Accordingly, the crankshaft 12 is rotated normally. Since a rotation fluctuation caused by a misfire in the first subject cylinder follows a normal rotation, the rise of the rotation fluctuation in the first subject cylinder is distinct. Therefore, even if the third determination value γ is a relatively small value, periodic rotation fluctuation is detected. The third determination value γ is used mainly for detecting periodic rotation fluctuation. Whether a misfire occurs in the first subject cylinder is determined based on a fourth determination value δ, which will be discussed below.

Figure 6:
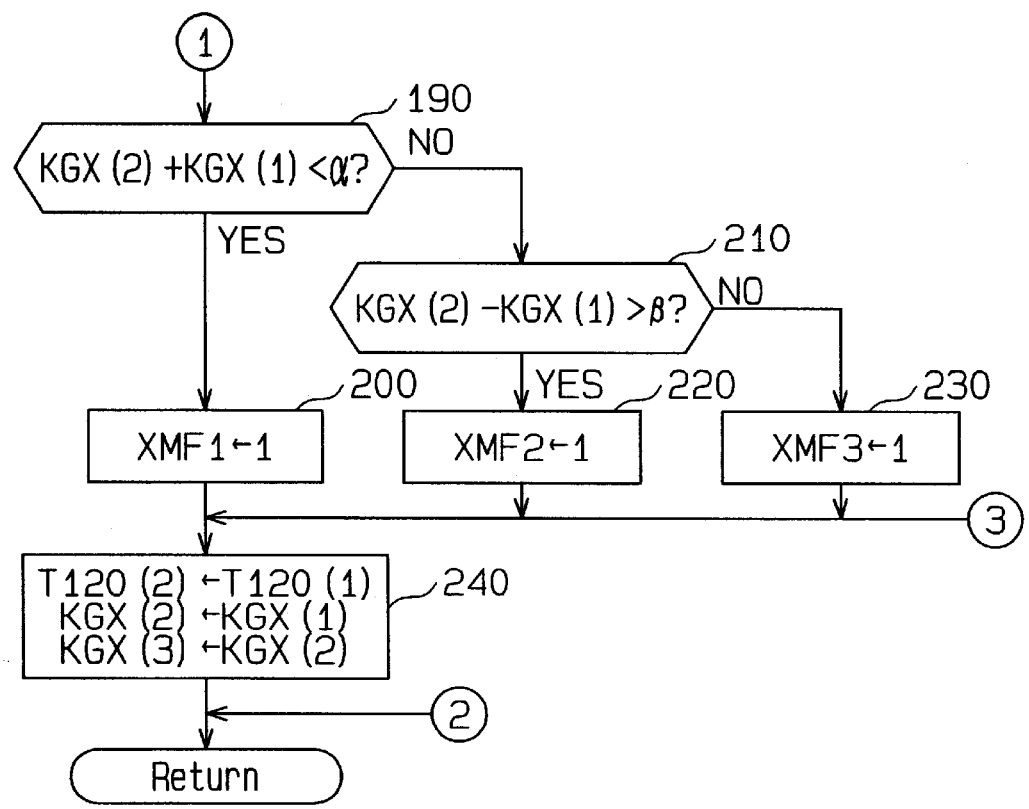
FIG. 6 is a flowchart showing the second half of the misfire detection routine.

If the outcome of step 160 is negative, the ECU 26 proceeds to step 240 of FIG. 6. If the outcome of step 160 is positive, the ECU 26 proceeds to step 170. In step 170, the ECU 26 determines whether a misfire has occurred in a first subject cylinder, which is a first cylinder to be ignited in three cylinders that are ignited consecutively, or in three cylinders that are subjected to misfire detection. Specifically, the ECU 26 determines whether the rotation fluctuation amount KGX(3) at the first subject cylinder is more than the predetermined value δ(δ>γ). If the outcome is negative, the ECU 26 proceeds to step 240 of FIG. 6. If the outcome is positive, the ECU 26 determines that a misfire has occurred in the first subject cylinder and proceeds to step 180. In step 180, the ECU 26 distinguishes which one of the first to sixth cylinders #1 to #6 is the first subject cylinder.

Distinction on which of the first-to sixth cylinder #1 to #6 is the first subject cylinder is executed based on a signal form the crank angle sensor 24 and a signal from the cylinder distinguishing sensor 25. That is, based on pulse signals from the cylinder distinguishing sensor 25, the crank angle at which the piston of the first cylinder #1 reaches the top dead center of a compression stroke is set as a reference angle position. With reference to the reference angle position, the crank angle at which a misfire occurs in the current first subject cylinder is computed based on pulse signals generated by the crank angle sensor 24 at every 30° CA. Based on the computed crank angle, which one of the first to sixth cylinders #1 to #6 is the first subject cylinder is determined.

In steps 190 to 230 of FIG. 6, the ECU 26 determines which one of the single-cylinder misfire, the consecutive-two-cylinder misfire, and the intermittent-two-cylinder misfire is the type of the occurring misfire based on the rotation fluctuation patterns shown in FIGS. 2(a) to 4(c).

That is, in step 190, the ECU 26 determines whether type of the occurring misfire is a single-cylinder misfire or a two-cylinder misfire (the consecutive-two-cylinder misfire or the intermittent-two-cylinder misfire). Specifically, the ECU 26 computes the sum of the rotation fluctuation amount KGX(2) at the second subject cylinder and the rotation fluctuation amount KGX(1) at the third subject cylinder, or the added-up fluctuation amount KGX(+). The ECU 26 then determines whether the added-up fluctuation amount KGX(+) is less than the first determination value α. As described above, the first determination value α is set to zero.

If the added-up fluctuation amount KGX(+) is less than the first determination value α, the ECU determines that a misfire is occurring only in the first subject cylinder, or that the single-cylinder-misfire is occurring, and then proceeds to step 200. In step 200, the ECU 26 sets a flag XMF1 for indicating a single-cylinder misfire to one, and proceeds to step 240.

If the added-up fluctuation amount KGX(+) is equal to or more than the first determination value α in step 190, the ECU 26 determines that a two-cylinder misfire (the consecutive-two-cylinder misfire or the intermittent-two-cylinder misfire) is occurring, and-proceeds to step 210. In step 210, the ECU 26 subtracts the rotation fluctuation amount KGX(1) at the third subject cylinder from the rotation fluctuation amount KGX(2) at the second subject cylinder, and sets the resultant as the fluctuation amount deviation KGX(−). The ECU 26 determines whether the fluctuation amount deviation KGX(−) is more than the second determination value β. As described above, the second determination value β is set to zero.

If the fluctuation amount deviation KGX(−) is more than the second determination value β, the ECU 26 determines that a misfire is consecutively occurring in the first subject cylinder and in the second subject cylinder, and proceeds to step 220. In step 220, the ECU 26 sets a flag XMF2 for indicating a consecutive-two-cylinder misfire to one, and proceeds to step 240.

If the fluctuation amount deviation KGX(−) is equal to or less than the second determination value β in step 210, the ECU 26 determines a misfire is occurring in the first subject cylinder and in the third subject cylinder, and proceeds to step 230. In step 230, the ECU 26 sets a flag XMF3 for indicating an intermittent-two-cylinder misfire to one, and proceeds to step 240.

In preparation for the next execution of the misfire detection routine, the ECU 26 sets the elapsed time T120(1) read in step 130 as the elapsed time T120(2) in step 240. Therefore, in the next execution of the routine, the current elapsed time T120(1) of the combustion stroke in the third subject cylinder is used as the elapsed time T120(2) of a combustion stroke in the second subject cylinder. The ECU 26 sets the rotation fluctuation amount KGX(1) obtained in step 150 as the rotation fluctuation amount KGX(2), and sets the current rotation fluctuation amount KGX(2) as the rotation fluctuation amount KGX(3). Therefore, in the next execution of the routine, the current rotation fluctuation amount KGX(1) at the third subject cylinder is used as the rotation fluctuation KGX(2) at the second subject cylinder, and the current rotation fluctuation amount KGX(2) at the second subject cylinder is used as the rotation fluctuation amount KGX(3) at the first subject cylinder. The ECU 26 stores the newly set values in the RAM and temporarily suspends the misfire detection routine.

Although not illustrated, when the flag XMF1, XMF2 or XMF3 is set to one in step 200, 220 or 230, it is preferable that the occurrence of a misfire be informed to a driver with an appropriate alarm device.

This embodiment provides the following advantages.

When a single-cylinder misfire occurs, various rotation fluctuation patterns appear as shown in FIGS. 2(a) to 2(c) depending on the type of the engine 11 and the running state of the engine 11. When a two-cylinder misfire (a consecutive-two-cylinder misfire or an intermittent-two-cylinder misfire) occurs, various rotation fluctuation patterns appear as shown in FIGS. 3(a) to 4(c) depending on the type of the engine 11 and the running state of the engine 11. However, in any of the rotation fluctuation patterns of FIGS. 2(a) to 2(c) in a single-cylinder misfire, the sum of the rotation fluctuation amount KGX(2) at the second cylinder #2, in which a normal combustion is performed, and the rotation fluctuation amount KGX(1) at the third cylinder #3, in which a normal combustion is performed, is less than zero. In any of the rotation fluctuation patterns of a two-cylinder misfire shown in FIGS. 3(a) to 4(c), the sum of the rotation fluctuation amount in one of the second and third cylinders #2 and #3 in which a normal combustion is performed and the rotation fluctuation amount in the other one of the second and third cylinders #2 and #3, in which a misfire occurs, is more than zero.

In this embodiment, based on the characteristics of the rotation fluctuation pattern in a single-cylinder misfire and the characteristics of the rotation fluctuation pattern in a two-cylinder misfire, the type of an occurring misfire is determined to be one of a single-cylinder misfire and a two-cylinder misfire. Specifically, the sum of the rotation fluctuation amount KGX(2) at the second subject cylinder and the rotation fluctuation amount KGX(1) at the third subject cylinder, or the added-up fluctuation amount KGX(+), is compared to the first determination value $\alpha$ ($\alpha=0$). If the added-up fluctuation amount KGX(+) is less than the first determination value $\alpha$, it is determined that a single-cylinder misfire is occurring, and if not, it is determined that a two-cylinder misfire is occurring. Therefore, regardless of various rotation fluctuation patterns due to a misfire, the occurring misfire is accurately determined to be one of a single-cylinder misfire and a two-cylinder misfire based on the same determination conditions.

Figure 7:
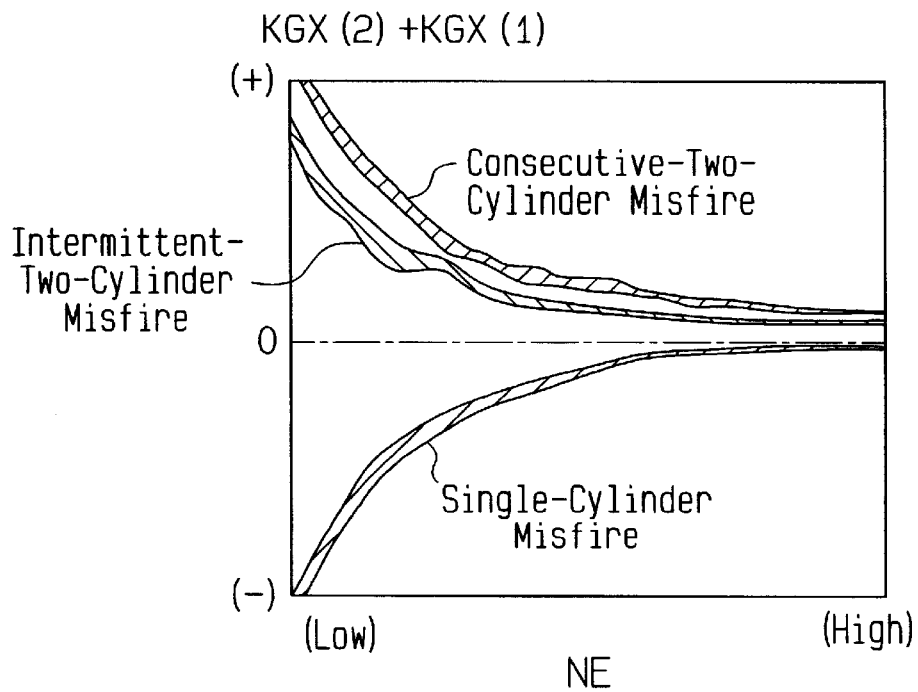
FIG. 7 is a graph showing the distribution of an added-up fluctuation amount (KGX(2)+KGX(1))

FIG. 7 is a graph showing the relationship between the added-up fluctuation amount KGX(+) and the engine rotation speed NE in each of a single-cylinder misfire, a consecutive-two-cylinder misfire, and an intermittent-two-cylinder misfire. In FIG. 7, the regions corresponding to the distribution of the added-up fluctuation amount KGX(+) of each misfire type are crosshatched for purposes of illustration. Referring to FIG. 7, the added-up fluctuation amount KGX(+) of the single-cylinder misfire changes according to the engine rotation speed NE, but is less than zero, which is the first determination value $\alpha$, in the entire engine rotation speed range. The added-up fluctuation amount KGX(+) of a two-cylinder misfire (a consecutive-two-cylinder misfire and an intermittent-two-cylinder misfire) also changes according to the engine rotation speed NE, but is equal to or more than zero, which is the first determination value $\alpha$, in the entire engine rotation speed range.

Therefore, the graph of FIG. 7 supports the fact that the type of an occurring misfire is accurately determined to be one of the single-cylinder misfire and a two-cylinder misfire based on whether the added-up fluctuation amount KGX(+) is less than the first determination value $\alpha$.

In any of the rotation fluctuation patterns of FIGS. 3(a) to 3(c) of a consecutive-two-cylinder misfire, the value obtained by subtracting the rotation fluctuation amount KGX(1) at the third subject cylinder, in which a normal combustion is performed, from the rotation fluctuation amount KGX(2) at the second subject cylinder, in which a misfire occurs, is more than zero. In any of the rotation fluctuation patterns of FIGS. 4(a) to 4(c) of an intermittent-two-cylinder misfire, the value obtained by subtracting the rotation fluctuation amount KGX(1) at the third subject cylinder, in which a misfire occurs, from the rotation fluctuation amount KGX(2) at the second subject cylinder, in which a normal combustion is performed, is less than zero.

In this embodiment, after the type of an occurring misfire is determined not to be a single-cylinder misfire, the type of the occurring misfire is determined to be one of a consecutive-two-cylinder misfire and an intermittent-two-cylinder misfire based on the characteristics of the rotation fluctuation pattern in a consecutive-two-cylinder misfire and the characteristics of the rotation fluctuation pattern in an intermittent-two-cylinder misfire. Specifically, the value obtained by subtracting the rotation fluctuation amount KGX(1) at the third subject cylinder from the rotation fluctuation amount KGX(2) at the second subject cylinder, or the fluctuation amount deviation KGX(−), is compared to the second determination value $\beta$ ($\beta=0$). If the fluctuation amount deviation KGX(−) is more the second determination value $\beta$, it is determined that a consecutive-two-cylinder misfire is occurring, and if not, it is determined that an intermittent-two-cylinder misfire is occurring. Therefore, regardless of various rotation fluctuation patterns due to a misfire, the occurring misfire is accurately determined to be one of a consecutive-two-cylinder misfire and an intermittent-two-cylinder misfire based on the same determination conditions.

Figure 8:
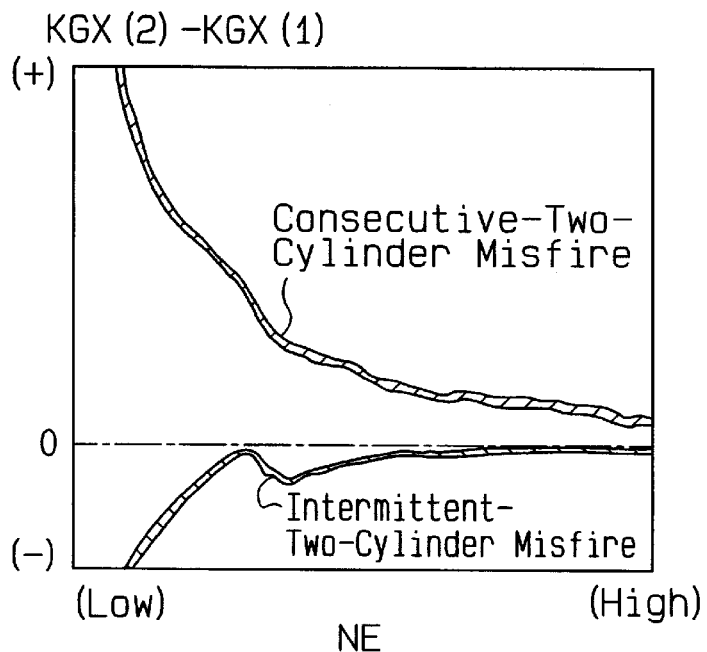
FIG. 8 is a graph showing the deviation of a fluctuation amount deviation (KGX(2)−KGX(1))

FIG. 8 is a graph showing the relationship between the fluctuation amount deviation KGX(−) and the engine rotation speed NE in each of a consecutive-two-cylinder misfire and an intermittent-two-cylinder misfire. In FIG. 8, the regions corresponding to the distribution of the fluctuation amount deviation KGX(−) of each misfire type are crosshatched for purposes of illustration. Referring to FIG. 8, the fluctuation amount deviation KGX(−) of a consecutive-two-cylinder misfire changes according to the engine rotation speed NE, but is more than zero, which is the second determination value $\beta$, in the entire engine rotation speed range. The fluctuation amount deviation KGX(−) of an intermittent-two-cylinder misfire changes according to the engine rotation speed NE, but is equal to or less than zero, which is the second determination value $\beta$, in the entire engine rotation speed range.

Therefore, the graph of FIG. 8 supports the fact that the type of an occurring misfire is accurately determined to be one of a consecutive-two-cylinder misfire and an intermittent-two-cylinder misfire based on whether the fluctuation amount deviation KGX(−) is more than the first determination value $\beta$.

As described above, regardless of various rotation fluctuation patterns due to a misfire, the type of the misfire is accurately determined to be one of a single-cylinder misfire, a consecutive-two-cylinder misfire, and an intermittent-two-cylinder misfire.

To distinguish whether an occurring misfire is a single-cylinder misfire or a two-cylinder misfire, it is sufficient to compare the added-up fluctuation amount KGX(+) with the predetermined first determination value $\alpha$. To distinguish whether an occurring misfire is a consecutive-two-cylinder misfire or an intermittent-two-cylinder misfire, it is sufficient to compare the fluctuation amount deviation KGX(−) with the predetermined second determination value $\beta$. Therefore, the misfire detection process is simple, and the load of the process applied to the engine 11 is reduced.

A second embodiment of the present invention will now be described with reference to FIGS. 9 and 13. The differences from the embodiment of FIGS. 1 to 8 will mainly be discussed. In the second embodiment, the first determination value α and the second determination value β are not constant but are varied according to the running state of the engine 11, or the engine rotation speed NE. Also, the added-up fluctuation amount KGX(+) and the fluctuation amount deviation KGX(−) are corrected based on a parameter representing the load on the engine 11. As the parameter, the rotation fluctuation amount KGX(3) at the first subject cylinder is used. Other than these differences, the second embodiment is the same as the first embodiment.

A misfire detection routine executed by the ECU 26 will now be described with reference to flowcharts of FIG. 9. In the second embodiment, instead of steps 190 to 240 of FIG. 6, steps 195 to 240 of FIG. 9 are executed after steps 110 to 180 of FIG. 5. In FIG. 9, the same step numbers that are the same as those in FIG. 6 represent the same processes as those in FIG. 6. Therefore, only the different processes from FIG. 6 will be discussed below.

Figure 9:
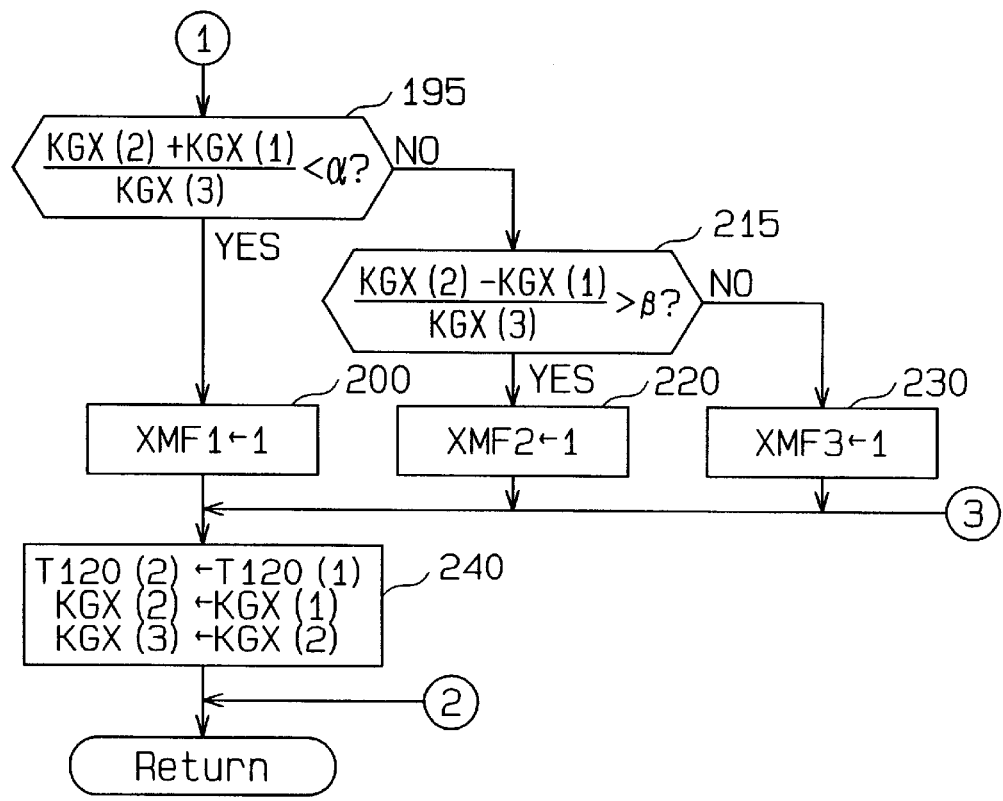
FIG. 9 shows a part of a misfire detection routine according to a second embodiment of the present invention.
Figure 10:
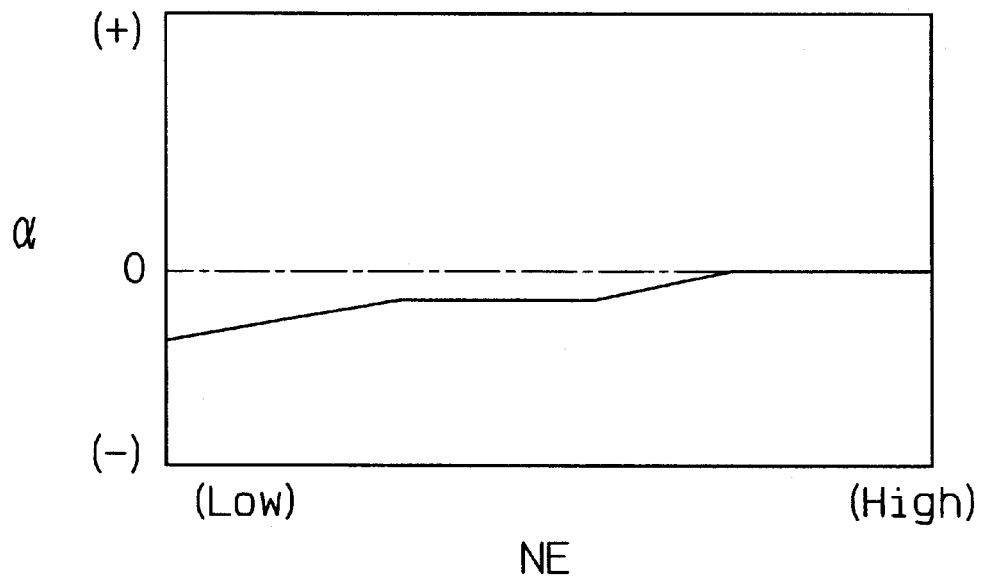
FIG. 10 is a graph showing a map for determining a first determination value $\alpha$.

After step 180 of FIG. 5, the ECU 26 proceeds to step 195 of FIG. 9. Step 195 replaces step 190 of FIG. 6. In step 195, the ECU 26 divides the added-up fluctuation amount KGX(+) by the rotation fluctuation amount KGX(3) at the first subject cylinder, and determines whether the division result (hereafter referred to as a corrected added-up fluctuation amount) is less than the first determination value α. In this embodiment, the first determination value α is computed, for example, by referring to a map shown in FIG. 10. The map defines the relationship between the engine rotation speed NE and the first determination value α. The first determination value αx is an intermediate value of the corrected added-up fluctuation amount (KGX(+)/KGX(3)) in a single-cylinder misfire and the corrected added-up fluctuation amount (KGX(+)/KGX(3)) in a two-cylinder misfire (see FIG. 12). Therefore, the first determination value α is a negative value when the engine rotation speed NE is low and approaches zero as the engine rotation speed NE increases. The map of FIG. 10 is no more than an example, and a map for setting the first determination value α may be changed as necessary as long as it satisfies the aforementioned conditions.

If the corrected added-up fluctuation amount (KGX(+)/KGX(3)) is less than the first determination value α, the ECU 26 determines that a single-cylinder misfire is occurring and proceeds to step 200. If the corrected added-up fluctuation amount (KGX(+)/KGX(3)) is equal to or more than the first determination value α, the ECU 26 determines that a two-cylinder misfire (a consecutive-two-cylinder misfire or an intermittent-two-cylinder misfire) is occurring, and proceeds to step 215. Step 215 replaces step 210 of FIG. 6.

Figure 11:
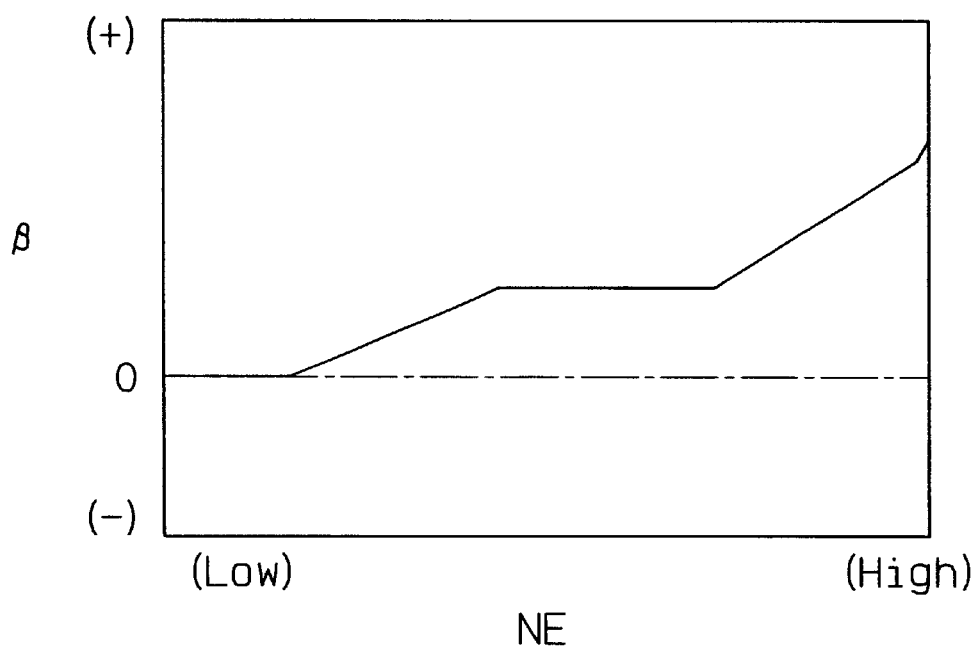
FIG. 11 is a graph showing a map for determining a second determination value $\beta$.

In step 215, the ECU 26 divides the fluctuation amount deviation KGX(−) by the rotation fluctuation amount KGX(3) at the first subject cylinder, and determines whether the division result (hereafter referred to as a corrected fluctuation amount deviation) is more than the second determination value β. In this embodiment, the second determination value β is computed, for example, by referring to a map shown in FIG. 11. The map defines the relationship between the engine rotation speed NE and the second determination value β. The second determination value β is an intermediate value of the corrected fluctuation amount deviation (KGX(−)/KGX(3)) in a consecutive-two-cylinder misfire and the corrected fluctuation amount deviation (KGX(−)/KGX(3)) in an intermittent two-cylinder misfire (see FIG. 13). Therefore, the second determination value β is zero or a value close to zero when the engine rotation speed NE is low and increases as the engine rotation speed NE increases. The map of FIG. 11 is no more than an example, and a map for setting the second determination value β may be changed as necessary as long as it satisfies the aforementioned conditions.

If the corrected fluctuation amount deviation (KGX(−)/KGX(3)) is more than the second determination value β, the ECU 26 determines that a consecutive-two-cylinder misfire is occurring and proceeds to step 220. If the corrected fluctuation amount deviation (KGX(−)/KGX(3)) is equal to or less than the second determination value β, the ECU 26 determines that an intermittent-two-cylinder misfire is occurring and proceeds to step 230.

In step 200, 220 or 230, the ECU 26 sets the flags XMF1, XMF2 and XMF3, each corresponding to the detected type of misfire, to one as described in the first embodiment. The ECU 26 then executes step 240 and temporarily suspends the misfire detection routine.

In addition to the advantages of the first embodiment shown in FIGS. 1 to 8, the second embodiment has the following advantages.

In different engine rotation speeds NE, the value of the rotation fluctuation amount KGX(i) can be different even if the rotation fluctuation patterns are identical. For example, in a low speed range of the engine 11, the absolute value of the rotation fluctuation amount KGX(i) is generally great, and a misfire further increases the absolute value of the rotation fluctuation amount KGX(i) Conversely, in a high speed range of the engine 11, the absolute value of the rotation fluctuation amount KGX(i) is generally small, and a misfire does not significantly change the absolute value of the rotation fluctuation amount KGX(i).

In the second embodiment, the first determination value a and the second determination value β are set according to the engine rotation speed NE. Therefore, regardless of changes of the rotation fluctuation amount KGX(i) in accordance with the engine rotation speed NE, a type of a misfire is accurately determined to be one of a single-cylinder misfire or a two-cylinder misfire based on the first determination value α. Also, a type of misfire is accurately determined to be one of a consecutive-two-cylinder misfire and an intermittent-two-cylinder misfire based on the second determination value β.

The rotation fluctuation amount KGX(i) can differ depending on the engine load. In this embodiment, the added-up fluctuation amount KGX(+) and the fluctuation amount deviation KGX(−) are corrected based on a parameter representing the engine load, specifically, the rotation fluctuation amount KGX(3) at the first subject cylinder. The corrected added-up fluctuation amount (KGX(+)/KGX(3)) and the corrected fluctuation amount deviation (KGX(−)/KGX(3)) are values from which the influence of the engine load is removed. Therefore, using the corrected added-up fluctuation amount (KGX(+)/KGX(3)) and the corrected fluctuation amount deviation (KGX(−)/KGX(3)) permits the type of a misfire to be accurately detected without being influenced by the engine load.

Figure 12:
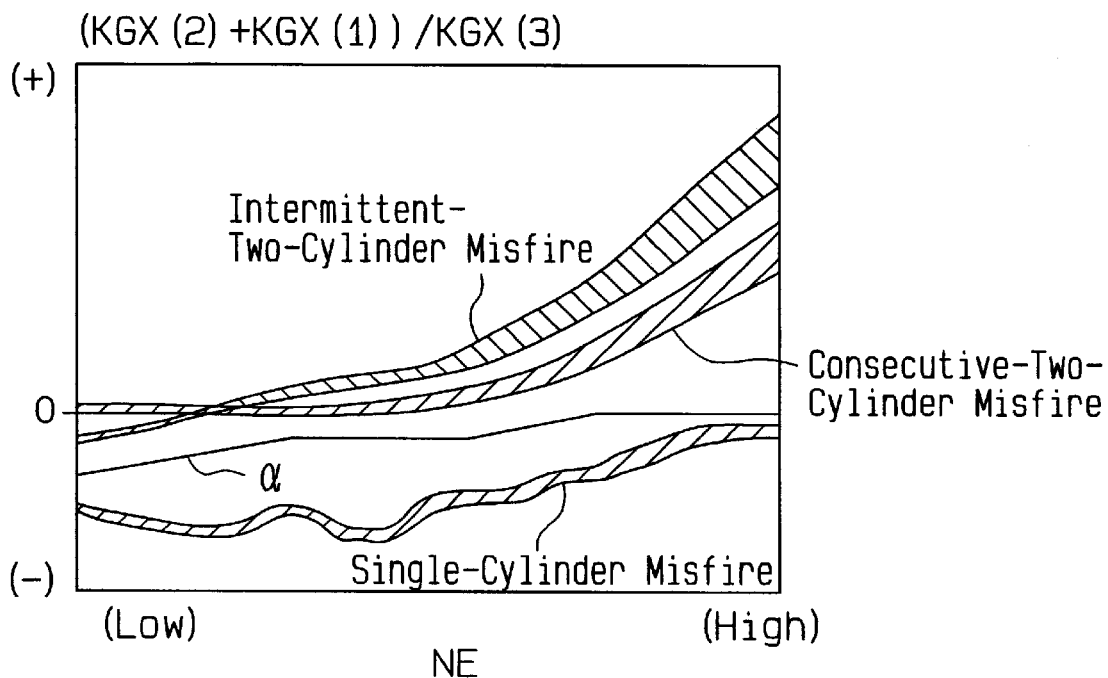
FIG. 12 is a graph showing the distribution of a corrected added-up fluctuation amount (KGX(2)+KGX(1))/KGX(3)

FIG. 12 is a graph showing the relationship between the corrected added-up fluctuation amount (KGX(+)/KGX(3)) and the engine rotation speed NE in each misfire type. In FIG. 12, the regions corresponding to the distribution of the corrected added-up fluctuation amount (KGX(+)/KGX(3)) of each misfire type are crosshatched for purposes of illustration. Referring to FIG. 12, the corrected added-up fluctuation amount (KGX(+)/KGX(3)) of a single-cylinder misfire changes according to the engine rotation speed NE, but is less than the first determination value α in the entire engine rotation speed range. The corrected added-up fluctuation amount (KGX(+)/KGX(3)) of a two-cylinder misfire (a consecutive-two-cylinder misfire or an intermittent-two-cylinder misfire) also changes according to the engine rotation speed NE, but are equal to or more than the first determination value α in the entire engine rotation speed range.

Therefore, the graph of FIG. 12 supports the fact that type of an occurring misfire is accurately determined to be one of a single-cylinder misfire or a two-cylinder misfire based on whether the corrected added-up fluctuation amount (KGX(+)/KGX(3)) is less than the first determination value α.

Figure 13:
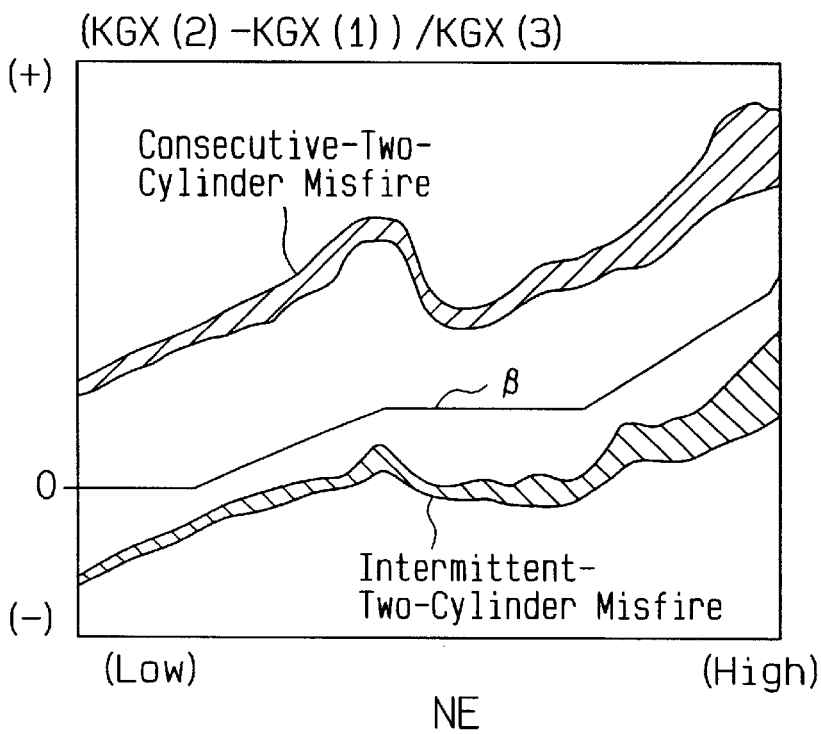
FIG. 13 is a graph showing a corrected fluctuation amount deviation (KGX(2)−KGX(1))/KGX(3)
Figure 14A:
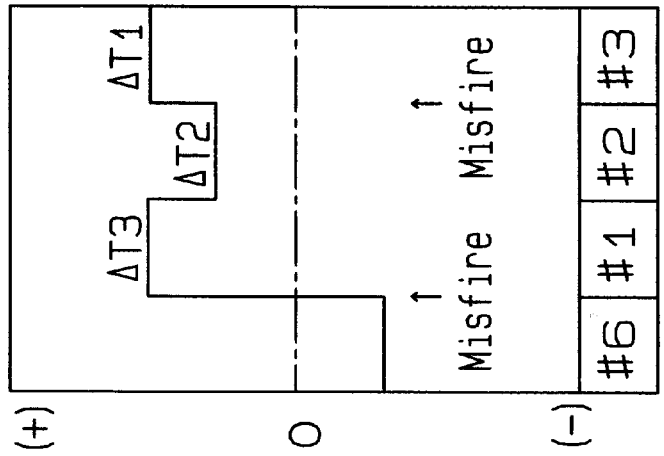
FIGS. 14(a) to 14(c) are graphs showing rotation fluctuation patterns of each type of misfire, which are considered in a prior art misfire detection.
Figure 14B:
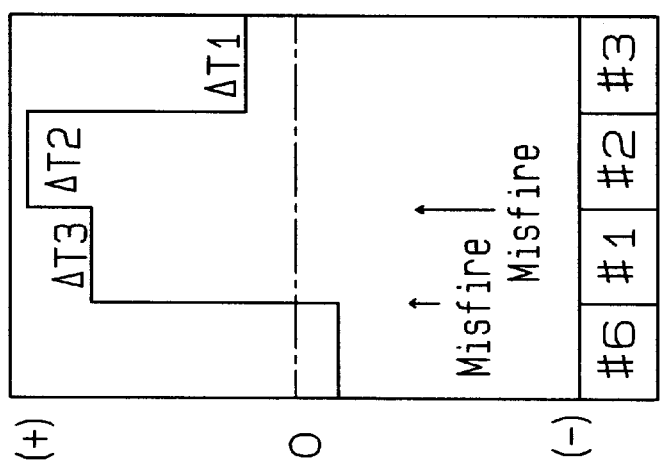
Figure 14C:
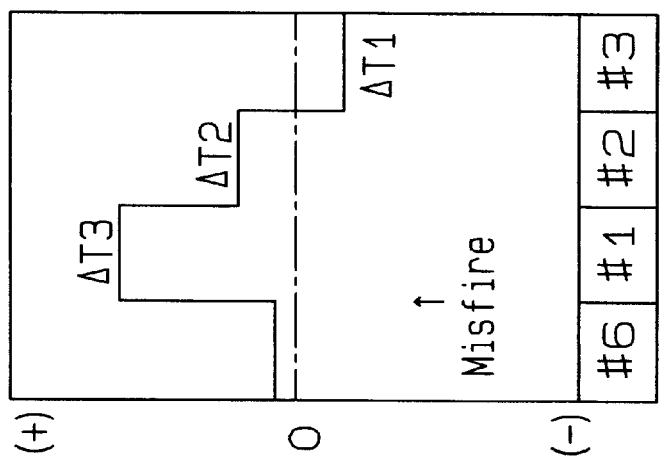

FIG. 13 is a graph showing the relationship between the corrected fluctuation amount deviation (KGX(−)/KGX(3)) and the engine rotation speed NE in each of a consecutive-two-cylinder misfire and an intermittent-two-cylinder misfire. In FIG. 13, the regions corresponding to the distribution of the corrected fluctuation amount deviation (KGX(−)/KGX(3)) of each misfire type are crosshatched for purposes of illustration. Referring to FIG. 13, the corrected fluctuation amount deviation (KGX(−)/KGX(3)) of a consecutive-two-cylinder misfire changes according to the engine rotation speed NE, but is more than the second determination value β in the entire engine rotation speed range. The corrected fluctuation amount deviation (KGX(−)/KGX(3)) of an intermittent-two-cylinder misfire changes according to the engine rotation speed NE, but is equal to or less than the second determination value β in the entire engine rotation speed range.

Therefore, the graph of FIG. 13 supports the fact that the type of an occurring misfire is accurately determined to be one of a consecutive-two-cylinder misfire and an intermittent-two-cylinder misfire based on whether the corrected fluctuation amount deviation (KGX(−)/KGX(3)) is more than the first determination value β.

It should be apparent to those skilled in the art that the present invention may be embodied in many other specific forms without departing from the spirit or scope of the invention. Particularly, it should be understood that the invention may be embodied in the following forms.

In the first embodiment shown in FIGS. 1 to 8, the first determination value α may be a constant value other than zero. The first determination value α may be any value as long as it is an intermediate value of the added-up fluctuation amount KGX(+) in the single-cylinder misfire and the added-up fluctuation amount KGX(+) in the two-cylinder misfire.

In the first embodiment shown in FIGS. 1 to 8, the second determination value β may be a constant value other than zero. The second determination value β may be any value as long as it is an intermediate value of the fluctuation amount deviation KGX(−) in the consecutive-two-cylinder misfire and the fluctuation amount deviation KGX(−) in the intermittent-two-cylinder misfire.

The fluctuation amount deviation KGX(−) may be a value (KGX(1)−KGX(2)), which is obtained by subtracting the rotation fluctuation amount KGX(2) at the second subject cylinder from the rotation fluctuation amount KGX(1) at the third subject cylinder. In this case, whether the fluctuation amount difference (KGX(1)−KGX(2)) is equal to or less than the second determination value β is determined in step 210 of FIG. 6.

In the second embodiment shown in FIGS. 9 to 13, at least one of the first determination value α and the second determination value β may be obtained using a predetermined arithmetic expression instead of using the maps (see FIGS. 10 and 11).

The present invention may be applied to engines other than the in-line six cylinder engine, particularly to a V-type engine. The present invention may be applied to an engine having cylinders the number of which is not six.

The present examples and embodiments are to be considered as illustrative and not restrictive and the invention is not to be limited to the details given herein, but may be modified within the scope and equivalence of the appended claims.

What is claimed is:

1. A misfire detection apparatus for an internal combustion engine having a plurality of cylinders, wherein the apparatus selects three of the cylinders that are consecutively ignited as subjects of misfire detection, and defines the selected cylinders as a first subject cylinder, a second subject cylinder, and a third subject cylinder in an order of ignition, wherein the apparatus is capable of detecting three types of misfire including a single-cylinder misfire, in which a misfire occurs only in the first subject cylinder, a consecutive-two-cylinder misfire, in which a misfire occurs in the first and second subject cylinders, and an intermittent-two-cylinder misfire, in which a misfire occurs in the first and third subject cylinders, the apparatus comprising:

computation means for obtaining a rotation fluctuation amount of the engine at each of the first to third subject cylinders;

first determination means for determining whether a misfire is occurring in the first subject cylinder based on the rotation fluctuation amount at the first subject cylinder;

second determination means, wherein, when it is determined that a misfire is occurring in the first subject cylinder, the second determination means determines whether the type of the occurring misfire is a single-cylinder misfire based on the rotation fluctuation amount at the second subject cylinder and the rotation fluctuation amount at the third subject cylinder; and third determination means, wherein, when it is determined that the type of the occurring misfire is not a single-cylinder misfire, the third determination means determines whether the type of the occurring misfire is a consecutive-two-cylinder misfire or an intermittent-two-cylinder misfire based on the rotation fluctuation amount at the second subject cylinder and the rotation fluctuation amount at the third subject cylinder.

2. The apparatus according to claim 1, wherein the second determination means adds up the rotation fluctuation amount at the second subject cylinder and the rotation fluctuation amount at the third subject cylinder and sets the resultant as an added-up fluctuation amount, and wherein the second determination means determines whether the type of the occurring misfire is a single-cylinder misfire based on a comparison between the added-up fluctuation amount and a predetermined first determination value.

3. The apparatus according to claim 2, wherein, when the added-up fluctuation amount is less than the first determination value, the second determination means determines that the type of the occurring misfire is a single-cylinder misfire.

4. The apparatus according to claim 2, wherein the second determination means varies the first determination value according to a running state of the engine.

5. The apparatus according to claim 4, wherein the running state of the engine includes a rotation speed of the engine.

6. The apparatus according to claim 2, wherein the second determination means corrects the added-up fluctuation amount according to a parameter representing a load applied to the engine.

7. The apparatus according to claim 6, wherein the parameter includes the rotation fluctuation amount at the first subject cylinder.

8. The apparatus according to claim 7, wherein the second determination means divides the added-up fluctuation amount by the rotation fluctuation amount at the first subject cylinder and sets the resultant as a corrected added-up fluctuation amount, and wherein the second determination means determines whether the type of the occurring misfire is a single-cylinder misfire based on a comparison between the corrected added-up fluctuation amount and the first determination value.

9. The apparatus according to claim 1, wherein the third determination means obtains the difference between the rotation fluctuation amount at the second subject cylinder and the rotation fluctuation amount at the third subject cylinder and sets the difference as a fluctuation amount deviation, and wherein the third determination means determines whether the type of the occurring misfire is a consecutive-two-cylinder misfire or an intermittent-two-cylinder misfire based on a comparison between the fluctuation amount deviation and a predetermined second determination value.

10. The apparatus according to claim 9, wherein, when the fluctuation amount deviation is more than the second determination value, the third determination means determines that the type of the occurring misfire is a consecutive-two-cylinder misfire, and wherein, when the fluctuation amount deviation is equal to or less than the second determination value, the third determination means determines that the type of the occurring misfire is an intermittent-two-cylinder misfire.

11. The apparatus according to claim 9, wherein the third determination means varies the second determination value according to a running state of the engine.

12. The apparatus according to claim 11, wherein the running state of the engine includes a rotation speed of the engine.

13. The apparatus according to claim 9, wherein the third determination means corrects the fluctuation amount deviation according to a parameter representing a load applied to the engine.

14. The apparatus according to claim 13, wherein the parameter includes the rotation fluctuation amount at the first subject cylinder.

15. The apparatus according to claim 14, wherein the third determination means divides the fluctuation amount deviation by the rotation fluctuation amount at the first subject cylinder and sets the resultant as a corrected fluctuation amount deviation, and wherein the third determination means determines whether the type of the occurring misfire is a consecutive-two-cylinder misfire or an intermittent-two-cylinder misfire based on a comparison between the corrected fluctuation amount deviation and the second determination value.

16. The apparatus according to claim 1, wherein, when the rotation fluctuation amount at the first subject cylinder is more than a predetermined determination value, the first determination means determines that a misfire is occurring in the first subject cylinder.

17. The apparatus according to claim 1, wherein the computation means obtains an elapsed time of a predetermined interval of a combustion stroke in each cylinder, and wherein the computation means obtains the difference between the elapsed time corresponding to each subject cylinder and the elapsed time corresponding to a cylinder that has been ignited immediately before the subject cylinder, and set the difference as the rotation fluctuation amount at the subject cylinder.

18. A misfire detection apparatus for an internal combustion engine having a plurality of cylinders, wherein the apparatus selects three of the cylinders that are consecutively ignited as subjects of misfire detection, and defines the selected cylinders as a first subject cylinder, a second subject cylinder, and a third subject cylinder in an order of ignition, wherein the apparatus is capable of detecting three types of misfire including a single-cylinder misfire, in which a misfire occurs only in the first subject cylinder, a consecutive-two-cylinder misfire, in which a misfire occurs in the first and second subject cylinders, and an intermittent-two-cylinder misfire, in which a misfire occurs in the first and third subject cylinders, the apparatus comprising:

a computer, wherein the computer obtains a rotation fluctuation amount of the engine at each of the first to third subject cylinders;

wherein the computer determines whether a misfire is occurring in the first subject cylinder based on the rotation fluctuation amount at the first subject cylinder;

wherein, when it is determined that a misfire is occurring in the first subject cylinder, the computer determines whether the type of the occurring misfire is a single-cylinder misfire based on the rotation fluctuation amount at the second subject cylinder and the rotation fluctuation amount at the third subject cylinder; and wherein, when it is determined that the type of the occurring misfire is not a single-cylinder misfire, the computer determines whether the type of the occurring misfire is a consecutive-two-cylinder misfire or an intermittent-two-cylinder misfire based on the rotation fluctuation amount at the second subject cylinder and the rotation fluctuation amount at the third subject cylinder.

19. A misfire detection method for an internal combustion engine having a plurality of cylinders, the method comprising:

selecting three of the cylinders that are consecutively ignited as subjects of misfire detection, and defining the selected cylinders as a first subject cylinder, a second subject cylinder, and a third subject cylinder in an order of ignition; and determining a occurring misfire to be one of three types of misfire including a single-cylinder misfire, in which a misfire occurs only in the first subject cylinder, a consecutive-two-cylinder misfire, in which a misfire occurs in the first and second subject cylinders, and an intermittent-two-cylinder misfire, in which a misfire occurs in the first and third subject cylinders, wherein the determining of the misfire type includes:

obtaining a rotation fluctuation amount of the engine at each of the first to third subject cylinders;

determining whether a misfire is occurring in the first subject cylinder based on the rotation fluctuation amount at the first subject cylinder;

determining whether the type of the occurring misfire is a single-cylinder misfire based on the rotation fluctuation amount at the second subject cylinder and the rotation fluctuation amount at the third subject cylinder when it is determined that the misfire is occurring in the first subject cylinder; and determining whether the type of the occurring misfire is a consecutive-two-cylinder misfire or an intermittent-two-cylinder misfire based on the rotation fluctuation amount at the second subject cylinder and the rotation fluctuation amount at the third subject cylinder when it is determined that the type of the occurring misfire is not a single-cylinder misfire.

* * * * *